Patented Feb. 14, 1939

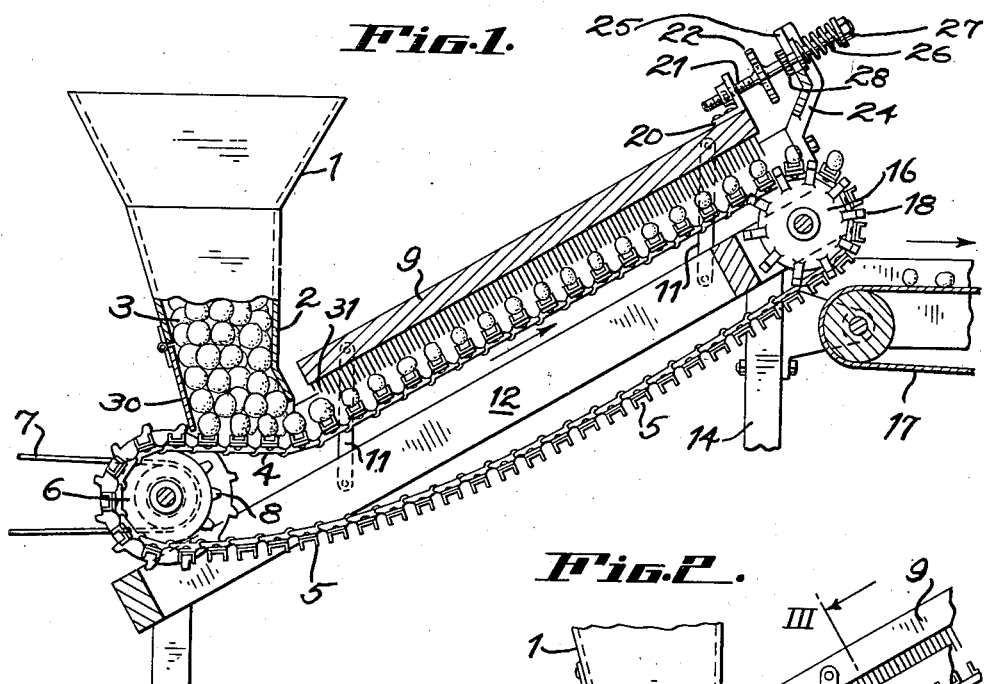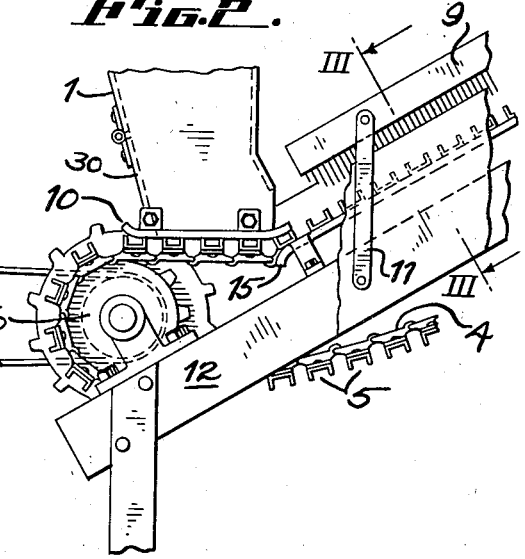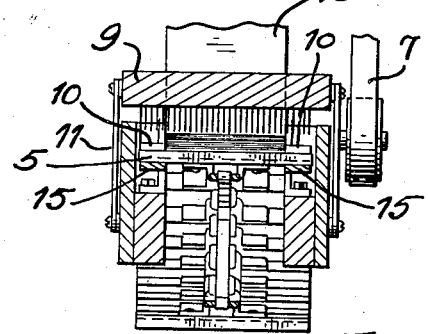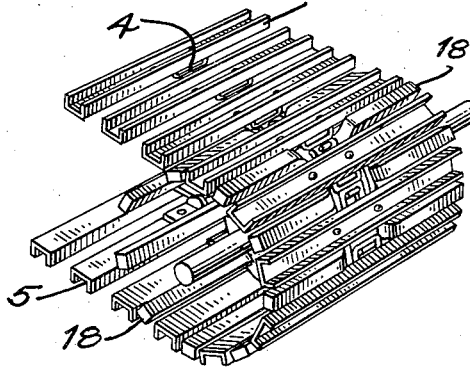

2,147,022

UNITED STATES PATENT OFFICE 2,147,022

WALNUT-HULLING DEVICE

William E. Formway, Los Altos, Calif.

Application November 19, 1936, Serial No. 111,589

2 Claims. (Cl. 83—35)

My invention relates to a walnut hulling device, and more particularly to a walnut huller wherein the hulls are cut before and during removal thereof.

The present application is a continuation in part of my prior application, Serial No. 44,530, filed October 11, 1935 which became Patent No. 2,094,880 on October 5, 1937.

In my prior application above referred to, I have described and claimed a walnut huller wherein the unhulled walnuts are passed beneath a floating brush having stiff wire bristles. The bristles puncture the hull, and continued progression beneath the brush causes the hull particles to become separated from the nut. My present invention utilizes the same general type of brush, but in addition, utilizes a means and method of cutting the hulls in such a manner that the wires of the brush are not relied upon to break the hull before removal.

It is therefore the main object of my invention to provide a walnut hulling device wherein the hulls are subjected to a cutting action before and during a brushing action.

A further object of my invention is to provide a walnut huller which is positive in action and efficient in removal of hulls, especially those which are not cracked in any manner when received by the machine.

A still further object of my invention is to provide a draper for conveying unhulled walnuts beneath a cleaning brush, the draper being provided with cutting edges acting upon the hull.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Figure 1 is a longitudinal view, partly in section and partly in elevation, of a preferred embodiment of my invention.

Figure 2 is a diagrammatic enlargement of Figure 1, showing certain details of the entrance chute.

Figure 3 is a sectional view, taken as indicated by the line III—III in Figure 2.

Figure 4 is a perspective view of the discharge end of the draper and its associated gear.

My invention may be more fully understood by direct reference to the drawing:

A hopper 1 is provided with an entrance chute 2 in which unhulled walnuts 3 may be directed onto a draper comprising a central chain 4 carrying draper bars 5. These draper bars are preferably U-bars, positioned with the legs of the U facing outwardly. The draper is mounted beneath the chute 2 on driving gear 6, driven in any convenient manner as by a belt 7, the teeth 8 of the driving gear engaging the chain 4 of the draper.

The draper bars 5 extend horizontally across the open bottom of chute 2, in such a manner as to pick up and roll the unhulled nuts under a floating brush 9. The draper is maintained in horizontal position underneath the chute 2 by a horizontal shoe 10 on each side of the chute 2, bearing against the upper edges of the U-bars. Floating brush 9 is mounted by means of two parallel arms 11—11 on a main frame 12 which is provided with legs 14. Floating brush 9 is preferably placed at an angle of about 35°, and the draper, during its upward course, is maintained in alinement by a lower shoe 15 bearing against the lower surface of the U-bars. Thus, the draper maintains a uniform course beneath the brush, and at the upper end of the brush passes over a discharge gear 16. The bending of the draper around the gear 16 causes the nuts, as they emerge from beneath the brush 9, to be discharged upon a second draper 17, to be carried by it to the washing or other portion of the device, these latter portions having no part in the present invention.

The output gear 16 is provided with laterally extending arms 18 which fall between the draper bars during rotation. It is obvious that the draper bars 5 increase their spacing as they pass over the discharge gear 16, and nuts would fall through the spaces between the bars if it were not for the presence of the extensions 18, and their use insures that the nuts will all be carried over onto the second draper 17 without falling between the draper bars.

I prefer to position parallel arms 11, which connect the frame 12 with brush 9, normally in a vertical position and therefore at an angle to both frame and brush. Thus it will be seen that as large nuts, for example, pass beneath the brush 9, the brush will tend to raise and move, following an arc, toward the entrance chute, and it is seen that the weight of the brush 9 bears upon the nuts, the brush rising and falling in accordance with the average size of the nuts passing beneath it. This floating brush was described in my prior application.

I have found, however, that it is sometimes advantageous to increase the effective weight of the brush, and for that reason I may provide means for placing an additional pressure on the brush as it rises. One embodiment of this means is shown at the output end of the brush and comprises a bracket 20 attached to the brush, through which is screwed a main shaft 21 turnable by an adjustment wheel 22.

A bent bracket 24 is attached to the main frame 12 and carries a slot 25. On the far side of the slot is positioned a return spring 26 held in place by nut and washer assembly 27. A stud 28 determines the minimum distance to which the brush may approach the draper, whereas the amount of the shaft 21 entering the brush bracket 20 determines the spring tension applied to the nuts.

The main feature of the present invention, however, lies in the action of the draper bars on the hulls. To prevent the hulled nuts packing in the chute 2, I prefer to provide the front of the chute with a movable wall 30 which is engaged by each draper bar as it passes along underneath the chute. The slight oscillation given this wall continually agitates the nuts as they approach the draper, and insures that they will not pack or jam. Nuts are picked up by the draper and carried under the entering edge of the brush. At this point I prefer to make the first few rows 31 of wires of slightly less length than the remainder, so that the nuts will enter beneath the brush readily.

As soon as pressure is exerted on the nuts between brush and draper, the nuts start to roll, and as they roll, they roll over the edges of the U-bars on the draper. I find that these edges make a sharp cut in the hull, and as the nuts are rolled along multiple cuts are made, and even hulls which stick fairly tightly to the shells of the nuts are then easily removed by the cleaning action of the wires. I am thus able to reduce the stiffness of the wires and thus reduce danger of shell puncture.

While in Figure 1 I have shown the nuts as rolling under the brush and being carried along by the draper bars, it is obvious that if the draper bars themselves are spaced the same distance as that between the legs of the U of each bar, the nuts may rest either between the edges of the same U-bar or the adjacent edges of adjacent U-bars.

I have found that while in certain instances it may be advantageous to actually sharpen the edges of the draper bars, or even to grind them so that a single edge is presented to the nut, in most instances all that is necessary is to utilize the squared end of the U-bars as normally manufactured.

By the use of my improved draper construction, and angularly positioned brush, together with the adjustment thereon, I have been able to materially decrease the number of unhulled nuts passing through the huller, and to obtain in general a cleaner and more uniformly hulled output. The number of cracked shells is reduced to a minimum and brush wear is greatly decreased.

I claim:

1. A walnut huller comprising a feed chute having an open bottom, a draper passing beneath said bottom, a plurality of cutter bars crossing said draper and open beneath to allow passage of hulls, said cutter bars being wider than said bottom, a horizontal shoe on each side of said hopper, the ends of said cutter bars bearing against said shoes, the angle of said shoes regulating the plane of the draper as it passes beneath said open bottom, an inclined brush having its low end adjacent said open bottom, and an inclined shoe bearing against the bottom of said cutter bars to direct said draper beneath said brush at an angle substantially parallel to the angle of said brush, and means for progressing said draper, said inclined shoe extending beneath said draper to a point substantially the far end of said brush.

2. Apparatus in accordance with claim 1, wherein a gear engages said draper after said draper leaves said inclined shoe, said gear having means thereon to prevent nuts from falling between said cutter bars as said bars pass around said gear.

WILLIAM E. FORMWAY.